US011149620B2

(12) United States Patent
Kuramashi et al.

(10) Patent No.: US 11,149,620 B2
(45) Date of Patent: Oct. 19, 2021

(54) EXHAUST DEVICE FOR ENGINE
(71) Applicant: Mazda Motor Corporation, Hiroshima (JP)
(72) Inventors: Taku Kuramashi, Hatsukaichi (JP); Keishi Kitabatake, Hiroshima (JP); Hirokazu Hasegawa, Higashihiroshima (JP)
(73) Assignee: Mazda Motor Corporation, Hiroshima (JP)
(*) Notice: Subject to any disclaimer, the term of this patent is extended or adjusted under 35 U.S.C. 154(b) by 107 days.
(21) Appl. No.: 16/630,936
(22) PCT Filed: Jul. 18, 2018
(86) PCT No.: PCT/JP2018/026893
§ 371 (c)(1),
(2) Date: Jan. 14, 2020
(87) PCT Pub. No.: WO2019/021905
PCT Pub. Date: Jan. 31, 2019
(65) Prior Publication Data
US 2020/0232374 A1 Jul. 23, 2020
(30) Foreign Application Priority Data
Jul. 24, 2017 (JP) .............................. JP2017-142793
(51) Int. Cl.
F01N 13/10 (2010.01)
F01N 13/00 (2010.01)
(Continued)
(52) U.S. Cl.
CPC ................ F01N 13/10 (2013.01); F01N 3/24 (2013.01); F01N 13/009 (2014.06); F01N 13/04 (2013.01);
(Continued)
(58) Field of Classification Search
CPC ........ F01N 13/08; F01N 13/10; F01N 13/102; F01N 13/141; F01N 13/1872; F01N 2470/06; F01N 2470/24
See application file for complete search history.

(56) References Cited

U.S. PATENT DOCUMENTS 4,197,704 A * 4/1980 Date ...................... F02B 27/04
60/322
5,816,044 A 10/1998 Biggs
(Continued)

FOREIGN PATENT DOCUMENTS

CN 104350253 A 2/2015
FR 2946086 A1 12/2010
(Continued)

OTHER PUBLICATIONS

European Patent Office, Extended European Search Report Issued in Application No. 18838380.6, dated May 4, 2020, Germany, 5 pages.
(Continued)

Primary Examiner — Jonathan R Matthias
(74) Attorney, Agent, or Firm — Alleman Hall Creasman & Tuttle LLP

(57) ABSTRACT

An exhaust device includes a first exhaust pipe, a second exhaust pipe, and a third exhaust pipe. The first exhaust pipe is comprised of a pipe member. The second exhaust pipe and the third exhaust pipe are comprised of a tubular member including a merging tubular portion and a downstream tubular portion. In the merging tubular portion, exhaust gas to be discharged from an exhaust port of the second cylinder and exhaust gas to be discharged from an exhaust port of the third cylinder are merged. The merging tubular portion is comprised of combining a plurality of plate members, at least a part of which is formed by press working. A distal end of the first exhaust pipe is disposed inside the downstream tubular portion. The downstream tubular portion is offset on the side of the first cylinder with respect to a center in a cylinder array direction.

7 Claims, 5 Drawing Sheets

(51) Int. Cl.
*F01N 3/24* (2006.01)
*F01N 13/04* (2010.01)
(52) U.S. Cl.
CPC ...... *F01N 2240/20* (2013.01); *F01N 2470/06* (2013.01); *F01N 2470/24* (2013.01)

(56) References Cited

U.S. PATENT DOCUMENTS

| | | | |
|---|---|---|---|
| 8,459,016 B2* | 6/2013 | Ashida | F01N 13/10 60/323 |
| 2015/0152770 A1 | 6/2015 | Toichi et al. | |

FOREIGN PATENT DOCUMENTS

| | | |
|---|---|---|
| JP | S59165521 U | 11/1984 |
| JP | S63130618 U | 8/1988 |
| JP | H06229249 A | 8/1994 |
| JP | H09068040 A | 3/1997 |
| JP | 2001289044 A | 10/2001 |
| JP | 2016053311 A | 4/2016 |
| JP | 2016065465 A | 4/2016 |
| WO | 2005005816 A1 | 1/2005 |
| WO | WO-2005093229 A2 * | 10/2005 ........... F01N 13/017 |

OTHER PUBLICATIONS

China National Intellectual Property Administration, Office Action and Search Report Issued in Application No. 201880045339.X, dated Mar. 19, 2021, 8 pages.

* cited by examiner

EXHAUST DEVICE FOR ENGINE

TECHNICAL FIELD

The present invention relates to an exhaust device for an engine.

BACKGROUND ART

An exhaust pipe is mounted in each of exhaust ports of an engine. Patent Literature 1 discloses a conventional example regarding an exhaust device including exhaust pipes.

Patent Literature 1 discloses a configuration in which four exhaust pipes are mounted for exhaust ports of a 4-cylinder engine, the four exhaust pipes are gathered into a group of two pipes each on a downstream side, and the two groups are gathered into one pipe further on the downstream side.

A exhaust pipe collective structure is designed in terms of suppressing exhaust interference. Specifically, in a 4-cylinder engine in which an ignition order is defined in the order: #1 cylinder- #3 cylinder- #4 cylinder- #2 cylinder, an exhaust pipe connected to an exhaust port of the #1 cylinder and an exhaust pipe connected to an exhaust port of the #4 cylinder are collected, and an exhaust pipe connected to an exhaust port of the #2 cylinder, and an exhaust pipe connected to an exhaust port of the #3 cylinder are collected. Then, the exhaust pipes are collected into one pipe on the downstream side. By configuring as described above, it is possible to suppress exhaust interference.

CITATION LIST

Patent Literature

Patent Literature 1: Japanese Unexamined Patent Application Publication No. 2016-65465

SUMMARY OF INVENTION

In recent years, there is a demand for further miniaturizing an engine and a peripheral configuration thereof for a vehicle such as an automobile. In view of the above, there is an approach, in an exhaust device for an engine, of directly collecting a plurality of exhaust pipes connected to exhaust ports of cylinders in one pipe.

However, when a plurality of exhaust pipes are directly collected in one pipe by applying a configuration of an exhaust device according to a conventional art as it is, it is difficult to suppress exhaust interference. Specifically, when a plurality of exhaust pipes are directly collected in one pipe, exhaust interference may occur, since the plurality of the exhaust pipes are collected at a same position (collecting position).

In order to solve an issue as described above, an object of the present invention is to provide an exhaust device for an engine, which enables to suppress exhaust interference, while satisfying a demand for miniaturization.

An exhaust device for an engine according to one aspect of the present invention is the exhaust device connected to an exhaust port of the engine in which a plurality of cylinders are arranged in series. The exhaust device includes: a first exhaust pipe connected to an exhaust port of a first cylinder, among the plurality of the cylinders, being disposed at one end in the array direction; and a second exhaust pipe connected to an exhaust port of a second cylinder, and a third exhaust pipe connected to an exhaust port of a third cylinder, the second cylinder and the third cylinder among the plurality of the cylinders following the first cylinder in the array direction. The second exhaust pipe and the third exhaust pipe are comprised of a tubular member including a merging tubular portion in which exhaust gas from the exhaust port of the second cylinder and exhaust gas from the exhaust port of the third cylinder are merged; and a downstream tubular portion continued to the merging tubular portion via a communication opening portion, and formed on a downstream side in a flow direction of the exhaust gas. The first exhaust pipe is comprised of a pipe member. The merging tubular portion is comprised of combining a plurality of plate members, at least a part of which is formed by press working. The downstream tubular portion is disposed in such a way as to be offset on a side of the one end with respect to a center of the plurality of the cylinders in the array direction. A distal end of the first exhaust pipe is disposed inside the downstream tubular portion through the communication opening portion.

DESCRIPTION OF EMBODIMENTS

In the following, an embodiment of the present invention is described with reference to the drawings. The embodiment described in the following is one example according to the present invention. The present invention is not limited by the following embodiment except for an essential configuration thereof.

EMBODIMENT

An embodiment is described with reference to the drawings. In each of the drawings, X direction indicates a cylinder array direction of an engine, Y direction indicates a width direction of the engine, and Z direction indicates an up-down direction of the engine.

1. Overall Configuration

An overall configuration of an engine body 1 and an exhaust device 3 according to the present embodiment is described with reference to FIGS. 1 to 3.

Figure 1:
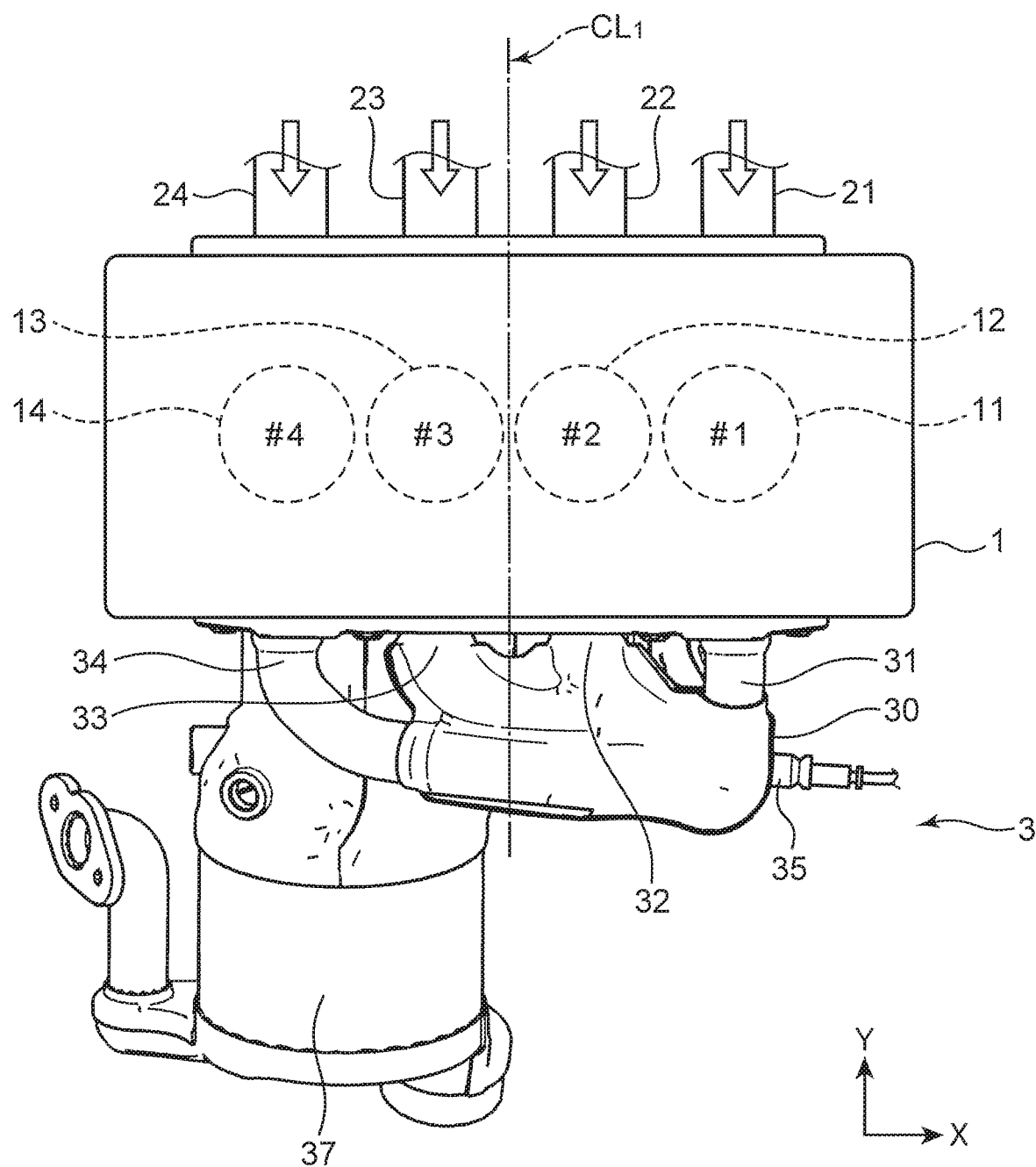
FIG. 1 is a schematic plan view illustrating a configuration of an engine body and an exhaust device according to an embodiment.

As illustrated in FIG. 1, the engine body 1 is an in-line 4-cylinder gasoline engine. In the engine body 1, a #1 cylinder 11, a #2 cylinder 12, a #3 cylinder 13, and a #4 cylinder 14 are arranged in this order from the right side in the X direction. In the present embodiment, an ignition order in the engine body 1 is the order: the #1 cylinder 11 → the #3 cylinder 13 → the #4 cylinder 14 → the #2 cylinder 12.

In FIG. 1, a cylinder head of the engine body 1 is viewed from above. An upper side in the Y direction is a vehicle front side, and a lower side in the Y direction is a vehicle rear side.

In the engine body 1, intake pipes 21 to 24 are connected to intake ports of the cylinders 11 to 14. The intake pipes 21 to 24 are, in order from the right side in the X direction, the #1 intake pipe 21, the #2 intake pipe 22, the #3 intake pipe 23, and the #4 intake pipe 24.

The exhaust device 3 is connected to the exhaust side of the engine body 1. As illustrated in FIGS. 1 and 2, the exhaust device 3 includes an exhaust pipe 30 and an engagement flange 40. The exhaust pipe 30 is comprised of #1 to #4 exhaust pipes 31 to 34 connected to exhaust ports of the cylinders 11 to 14.

The #2 exhaust pipe 32 and the #3 exhaust pipe 33 are comprised of a tubular member 41 formed by a plurality of members 300 to 303, which are press-worked plate members. As illustrated in FIG. 2, the tubular member 41 includes a merging tubular portion 38 formed by the merging tubular upper member 300 and the merging tubular lower member 301; and a downstream tubular portion 39 formed by the downstream tubular member 302 and the downstream tubular member 303. The merging tubular portion 38 is formed by joining end peripheries of the merging tubular member 300 and the merging tubular member 301 by welding or the like. Likewise, the downstream tubular portion 39 is formed by joining end peripheries of the downstream tubular member 302 and the downstream tubular member 303 by welding or the like.

Exhaust gas discharged through an exhaust passage of the #2 exhaust pipe 32 and exhaust gas discharged through an exhaust passage of the #3 exhaust pipe 33 are merged inside the merging tubular portion 38. Then, the merged exhaust gas flows to the downstream tubular portion 39 through a communication opening portion 301d.

Each of the #1 exhaust pipe 31 and the #4 exhaust pipe 34 is comprised of a pipe member, and is bent into a predetermined shape. Further, distal ends of the #1 exhaust pipe 31 and the #4 exhaust pipe 34 are received in the tubular member 41 formed by the members 300 to 303.

In the exhaust device 3 according to the present embodiment, the downstream tubular portion 39 is disposed in such a way as to be offset on the side of the #1 cylinder 11 (right side in FIG. 1) with respect to a center $CL_1$ of a cylinder array in the engine body 1 in the X direction. In other words, the downstream tubular portion 39 is disposed in an offset manner in an area associated with the #1 cylinder 11 in the X direction. The downstream tubular potion 39 is disposed vertically in such a way as to substantially align with the Z direction in the area associated with the #1 cylinder 11 in the X direction.

Figure 2:
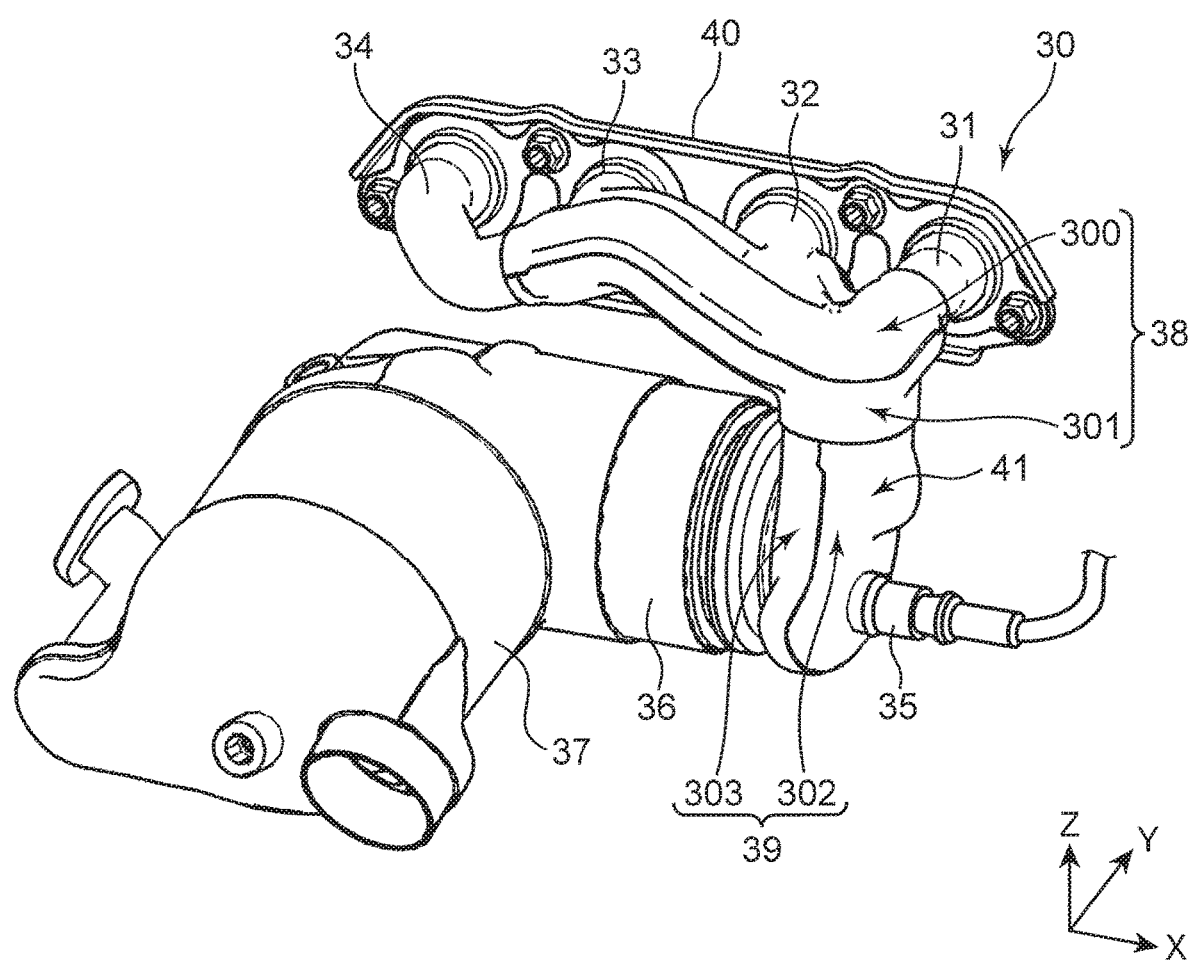
FIG. 2 is a schematic perspective view illustrating the configuration of the exhaust device.
Figure 3:
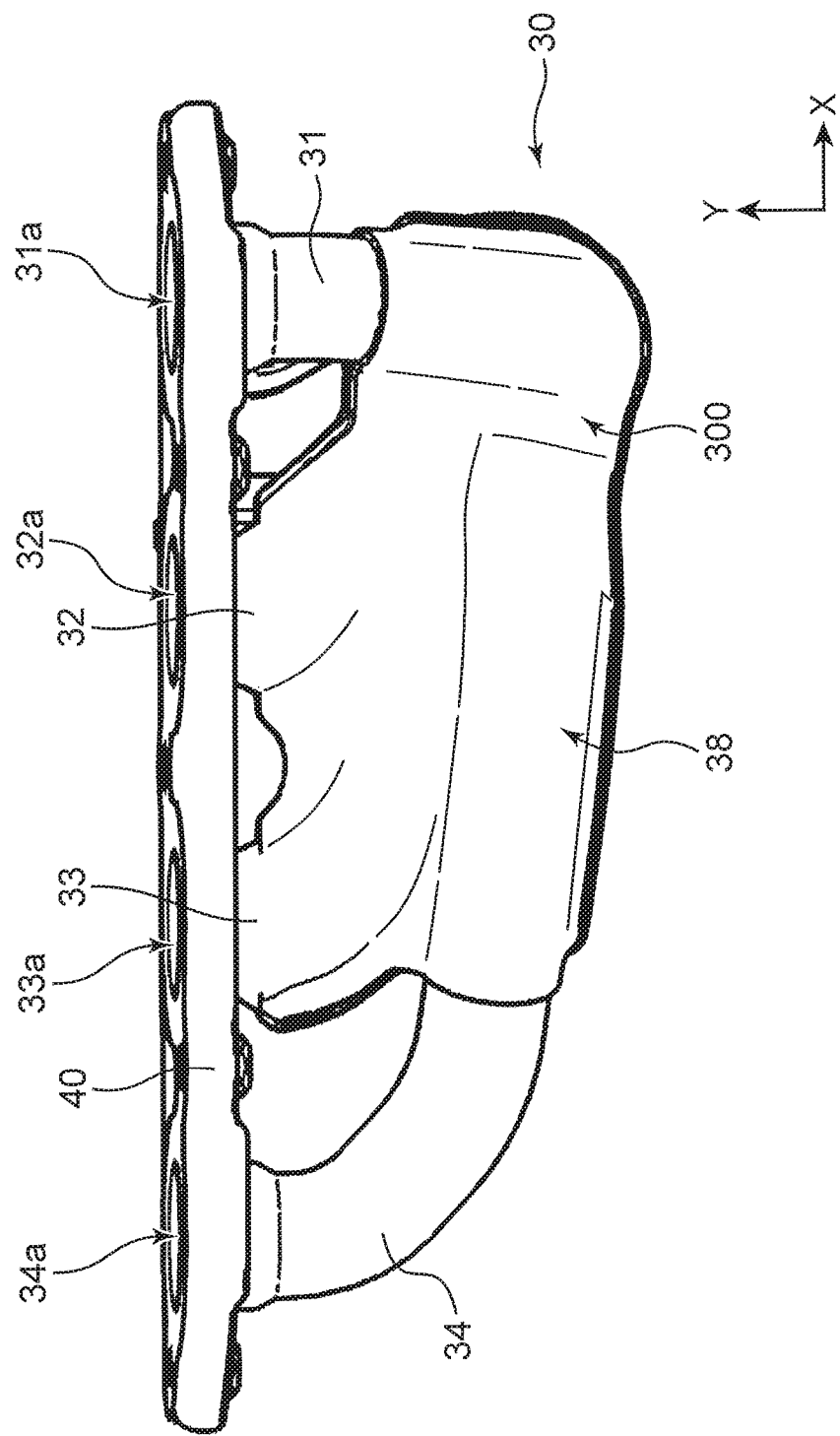
FIG. 3 is a schematic plan view illustrating a configuration of exhaust pipes.

As illustrated in FIG. 2, a distal end of an $O_2$ sensor 35 is received in a lower portion in the Z direction from the right side in the X direction. Further, a catalyst 36 being an exhaust gas purification device is connected to the downstream tubular portion 39 on a downstream side in a flow direction of exhaust gas. The catalyst 36 has a substantially cylindrical shape as an external appearance, and is disposed in such a way as to extend in the X direction on a lower side of the merging tubular portion 38 in the Z direction.

The catalyst 36 is connected to a gasoline particulate filter (GPF) 37 at a left end thereof in the X direction.

The engagement flange 40 engages the exhaust pipe 30 of the exhaust device 3 to a cylinder block of the engine body 1. As illustrated in FIG. 3, distal ends of the exhaust pipes 31 to 34 are received in the engagement flange 40, and port-side opening portions 31a to 34a face the exhaust ports of the engine body 1. The exhaust pipes 31 to 34 are airtightly connected to the exhaust ports of the engine body 1 by the engagement flange 40.

In the present embodiment, the exhaust pipe 30 is supported in a cantilever state by a portion engaged to the cylinder block by using the engagement flange 40.

2. Internal Configuration of Exhaust Pipe 30

Figure 4:
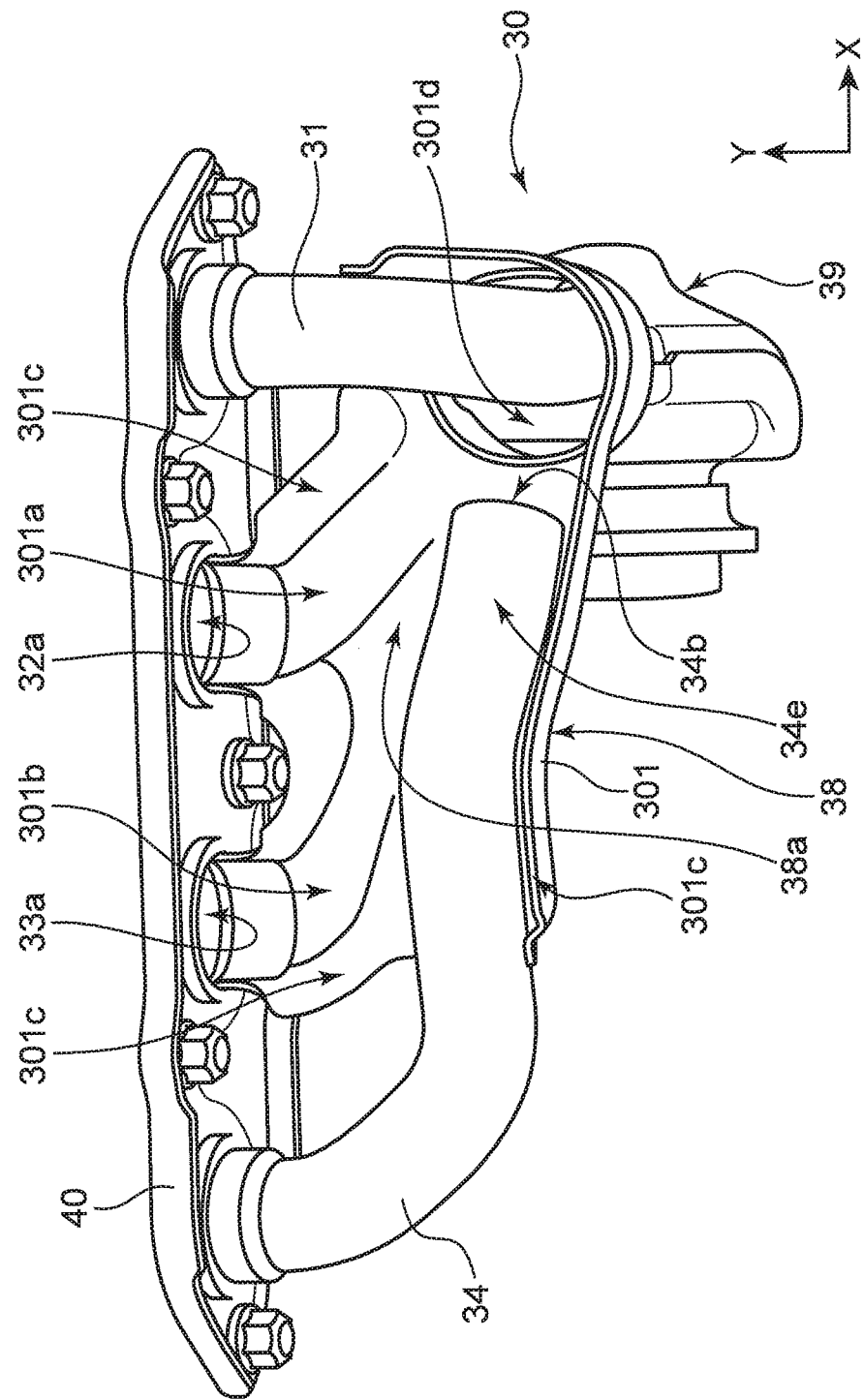
FIG. 4 is a schematic expanded view illustrating an internal configuration of the exhaust pipes.
Figure 5:
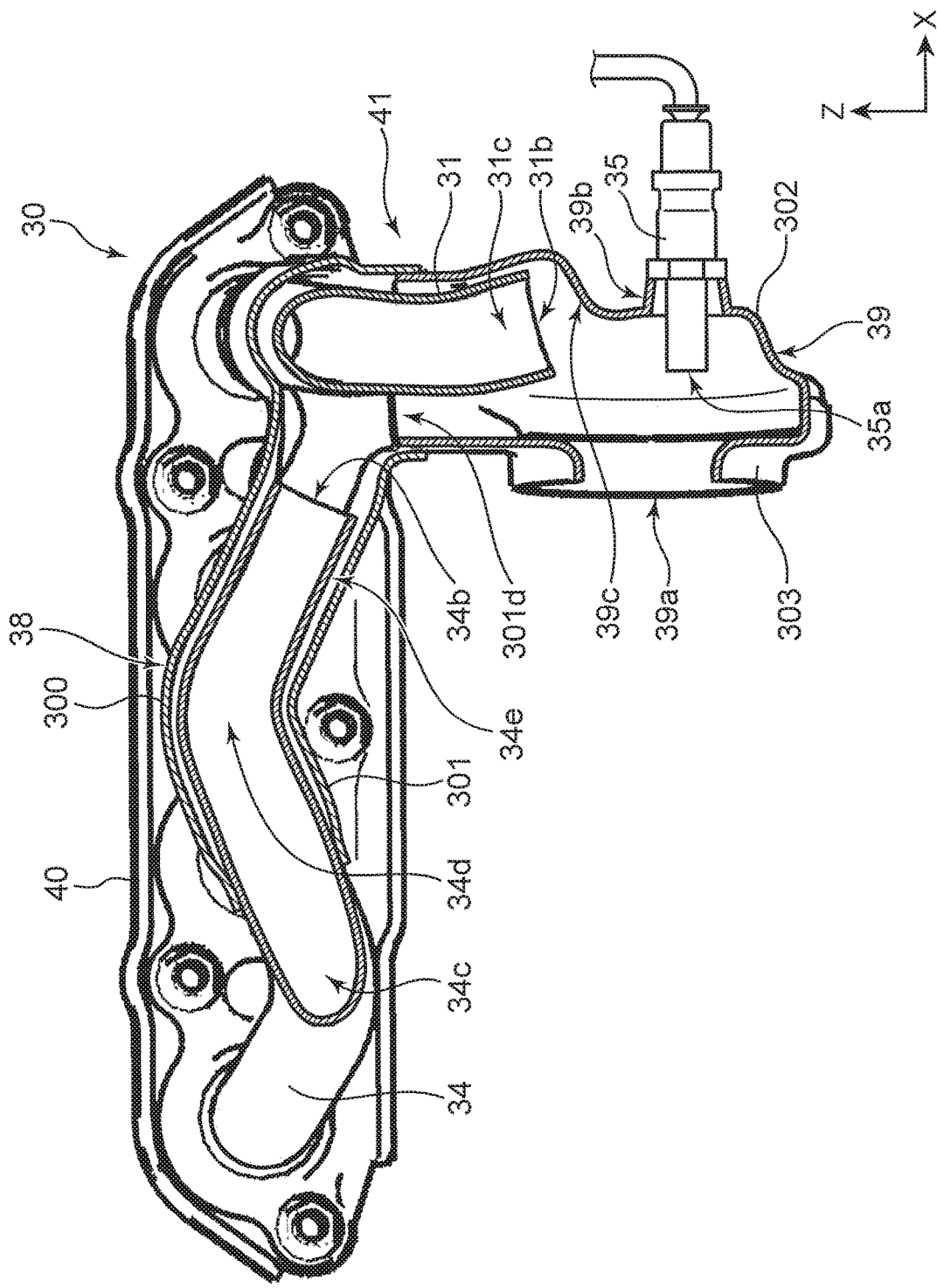
FIG. 5 is a schematic cross-sectional view illustrating the internal configuration of the exhaust pipes.

An internal configuration of the exhaust pipe 30 of the exhaust device 3 is described with reference to FIGS. 4 and 5. FIG. 4 is a schematic developed view illustrating the exhaust pipe 30 except for the merging tubular upper member 300. FIG. 5 is a schematic cross-sectional view in which the exhaust pipe 30 is partially cut away.

As illustrated in FIG. 4, a #2 exhaust groove portion 301a is formed in the merging tubular lower member 301 constituting the merging tubular portion 38 at a position associated with the #2 exhaust pipe 32, and a #3 exhaust groove portion 301b is formed at a position associated with the #3 exhaust pipe 33. Further, the #2 exhaust groove portion 301a communicates with the port-side opening portion 32a, and the #3 exhaust groove portion 301b communicates with the port-side opening portion 33a.

In FIG. 4, although illustration is omitted, the merging tubular upper member 300 is formed by press working in such a way as to be substantially symmetrical to the merging tubular lower member 301. Further, a joint peripheral portion 301c is formed on an outer periphery of the merging tubular lower member 301, and a joint peripheral portion is also formed on an outer periphery of the merging tubular upper member 300. The merging tubular upper member 300 and the merging tubular lower member 301 are airtightly joined to each other by the joint peripheral portions 301c.

As illustrated in FIG. 4, a portion where the #2 exhaust groove portion 301a and the #3 exhaust groove portion 301b intersect with each other, in other words, a merging portion 38a where exhaust gas from the #2 exhaust pipe 32 and exhaust gas from the #3 exhaust pipe 33 are merged is formed in an area on a side of the #4 cylinder 14 (left side in FIG. 4) in the X direction with respect to a position where the communication opening portion 301d is formed.

As illustrated in FIGS. 4 and 5, the #1 exhaust pipe 31 extends in the Y direction, and is bent in the Z direction at a position where the communication opening portion 301d is formed. A distal end 31c of the #1 exhaust pipe 31 is disposed at a position inside the downstream tubular portion 39 on a lower side in the Z direction with respect to the communication opening portion 301d. The distal end 31c of the #1 exhaust pipe 31 is slightly bent toward a side (rightwardly in FIG. 5) opposite to the #4 cylinder 14 in the X direction with respect to an axis aligned with the Z direction. Further, a distal-side opening portion 31b of the #1 cylinder 31 faces a shelf portion 39c, which is formed on a portion (right side portion in FIG. 5) of the downstream tubular portion 39 on a side opposite to the #4 cylinder 14 in the X direction.

The #4 exhaust pipe 34 is curved into a U-shape or a V-shape with a downwardly projecting shape (curved portion 34c) in the Z direction on an outer portion of the merging tubular portion 38, and is curved into a U-shape or a V-shape with an upwardly projecting shape (curved portion 34d) in the Z direction on an inner portion of the merging tubular portion 38. A distal end 34e of the #4 exhaust pipe 34 is disposed in such a way that a distal-side opening portion 34b faces a wall surface of the #1 exhaust pipe 31.

As illustrated in FIG. 4, the distal end 34e of the #4 exhaust pipe 34 is disposed on the side of the communication opening portion 301d with respect to the merging portion 38a where exhaust gas from the #2 exhaust pipe 32 and exhaust gas from the #3 exhaust pipe 33 are merged. Specifically, the distal end 34e of the #4 exhaust pipe 34 extends to a position close to the communication opening portion 301d with respect to the merging portion 38a.

As illustrated in FIG. 5, a catalyst-side opening portion 39a for connecting the catalyst 36 is formed in the downstream tubular portion 39. The catalyst-side opening portion 39a is formed in such a way as to face the left side in the X direction.

A sensor mounting portion 39b for mounting the 02 sensor 35 is formed on a wall portion of the downstream tubular portion 39 on the right side in the X direction. The $O_2$ sensor 35 is disposed inside the downstream tubular portion 39 through the sensor mounting portion 39b.

The shelf portion 39c of the downstream tubular portion 39 is formed at a position between the distal-side opening portion 31b of the #1 exhaust pipe 31, and the sensor mounting portion 39b in the Z direction.

3. Advantageous Effects

In the exhaust device 3 according to the present embodiment, the first exhaust pipe 31 is formed by using a pipe member, and the second exhaust pipe 32 and the third exhaust pipe 33 are comprised of the tubular member 41 (a member formed by the four press-worked plate members 300 to 303). Therefore, as compared with a case where all the exhaust pipes are formed by pipe members, or conversely, a case where all the exhaust pipes are comprised of one tubular member, it is possible to miniaturize the exhaust device 3.

When all the exhaust pipes are formed by pipe members, it is difficult to miniaturize the exhaust device as described in the above aspect, due to constraints in terms of production such as bending or welding a pipe member.

Further, when an exhaust pipe is comprised of a tubular member, it is difficult to miniaturize the exhaust device, when all the exhaust pipes are formed by one tubular member, since it is difficult to form a sharp bent portion of the pipe. Furthermore, when a plurality of exhaust pipes are comprised of a tubular member, it is also difficult to miniaturize the exhaust device, when all the exhaust pipes are comprised of one tubular member, since it is necessary to secure a width of a partition portion for separating the exhaust pipes one from another to some extent.

Further, in the exhaust device 3 according to the present embodiment, since the distal end 31c of the first exhaust pipe 31 is disposed at a position inside the downstream tubular portion 39, exhaust interference at least between exhaust gas to be discharged through the first exhaust pipe 31, and exhaust gas to be discharged through the second exhaust pipe 32 or the third exhaust pipe 33 is suppressed. Specifically, since the distal end 31c of the first exhaust pipe 31 extends to a position inside the downstream tubular portion 39 on a downstream side in a flow direction of exhaust gas with respect to the merging portion 38a where exhaust gas flowing through the second exhaust pipe 32 and exhaust gas flowing through the third exhaust pipe 33 are merged, it is possible to suppress exhaust interference.

Therefore, the exhaust device 3 according to the present embodiment is able to suppress exhaust interference, while satisfying a demand for miniaturization.

Further, in the exhaust device 3 according to the present embodiment, the fourth exhaust pipe 34 connected to an exhaust port of the fourth cylinder 14 is also comprised of a pipe member, and the distal end 34e of the fourth exhaust pipe 34 is received in the merging tubular portion 38 of the tubular member 41. Therefore, an exhaust device for an engine according to the present embodiment is able to secure a pipe length of the fourth exhaust pipe 34.

Further, in the present embodiment, as compared with a case where the fourth exhaust pipe is integrally formed with a tubular member, it is possible to miniaturize the exhaust device 3.

In the exhaust device 3 according to the present embodiment, since an exhaust passage of the fourth exhaust pipe, and an exhaust passage of the third exhaust pipe 33 are separated by a pipe wall constituting the fourth exhaust pipe 34, as compared with a case where the exhaust passages are separated by a plate member constituting the merging tubular portion 38, it is possible to further miniaturize the exhaust device 3.

In the exhaust device 3 according to the present embodiment, an in-line 4-cylinder gasoline engine is employed, and an ignition order is the order: the first cylinder 11→ the third cylinder 13→ the fourth cylinder 14→ the second cylinder 12. In an engine as described above, since the distal end 34e of the fourth exhaust pipe 34 is disposed on the side of the communication opening portion 301d with respect to the merging portion 38a of the merging tubular portion 38 where exhaust gas from the second exhaust pipe 32 and exhaust gas from the third exhaust pipe 33 are merged, it is possible to securely suppress exhaust interference.

In the exhaust device 3 according to the present embodiment, the downstream tubular portion 39 is disposed in such a way as to be offset on the side of the first cylinder 11 with respect to the center $CL_1$ of a cylinder array in the X-direction, and the catalyst 36 to be connected to the downstream tubular portion 39 is disposed in such a way as to extend along the cylinder array direction (X direction) on a lower side of the merging tubular portion 38 in the Z direction. Therefore, it is possible to further miniaturize the exhaust device 3.

Modifications

In the embodiment, an in-line 4-cylinder gasoline engine is employed as one example of the engine body 1. The present invention, however, is not limited to the above. For example, as a type of the engine, it is also possible to employ a diesel engine.

Further, the number of cylinders of the engine may be three, or five or more. In this case, the configuration number of exhaust pipes may be in conformity with the number of cylinders.

Further, a pattern of an engine is not limited to an in-line pattern, and a V-type engine or a W-type engine may be employed.

Further, in the embodiment, a configuration in which the downstream tubular portion 39 of the tubular member 41 is offset on the side of the #1 cylinder 11 with respect to the center $CL_1$ of the cylinder array in the X direction (cylinder array direction) is employed as one example. The present invention, however, is not limited to the above. For example, the downstream tubular portion 39 of a tubular member may be disposed in such a way as to be offset on the side of the #4 cylinder 14, which is opposite to the #1 cylinder 11 with respect to the center $CL_1$ of the cylinder array in the X direction (cylinder array direction).

Further, in the embodiment, the tubular member 41 is comprised of four plate members (the merging tubular upper member 300, the merging tubular lower member 301, the downstream tubular member 302, and the downstream tubular member 303). The present invention, however, is not limited to the above. For example, each of the merging tubular upper member 300 and the merging tubular lower member 301 constituting the merging tubular portion 38 may be extended, and a downstream tubular portion may be formed by the extended portions. Specifically, a tubular member comprised of a merging tubular portion and a downstream tubular portion may be comprised of combining two press-worked plate members. When such a modification is employed, it is possible to integrally form a tubular member comprised of a merging tubular portion and a downstream tubular portion by two plate members. Therefore, it is possible to reduce the number of parts, and suppress cumbersome parts management during production. Further, when the above modification is employed, as compared with a case where a merging tubular portion and a downstream tubular portion are formed as individual parts, by integrally forming a merging tubular portion and a downstream tubular portion, it is possible to reduce the number of steps such as joining the merging tubular portion and the downstream tubular portion, and reduce the production cost.

Further, it is possible to set the number of plate members constituting a tubular member to five or more.

Further, in the embodiment, all the four plate members (the merging tubular upper member 300, the merging tubular lower member 301, the downstream tubular member 302, and the downstream tubular member 303) are subjected to press working. The present invention, however, is not limited to the above. For example, it is possible to comprise of a merging tubular portion and a downstream tubular portion by combining a press-worked plate member, and a flat plate member which has not undergone press working.

Further, in the embodiment, the entirety of the tubular member 41 is comprised of combining four plate members. The present invention, however, is not limited to the above. For example, only a merging tubular portion among constituent elements of a tubular member may be comprised of combining a plurality of plate members, and a downstream tubular portion may be formed by a pipe member or the like.

Further, in the embodiment, as described with reference to FIG. 5, the curved portion 34c is formed on an outer portion of the merging tubular portion 38, and the curved portion 34d is formed on an inner portion of the merging tubular portion 38. The present invention, however, is not limited to the above. When it is not necessary to set a pipe length long, it is also possible to form the #4 exhaust pipe in such a way as to extend linearly.

Further, in the embodiment, the distal end 34e of the #4 exhaust pipe 34 is present inside the merging tubular portion 38. The present invention, however, is not limited to the above. It is also possible to employ a configuration in which the #4 exhaust pipe extends to a position of a downstream tubular portion through a communication opening portion, depending on the length of the #4 exhaust pipe.

Overview

An exhaust device for an engine according to one aspect of the present invention is an exhaust device connected to an exhaust port of an engine in which a plurality of cylinders are arranged in series. The exhaust device includes: a first exhaust pipe connected to an exhaust port of a first cylinder, among the plurality of the cylinders, disposed at one end in the array direction; and a second exhaust pipe connected to an exhaust port of a second cylinder, and a third exhaust pipe connected to an exhaust port of a third cylinder, the second cylinder and the third cylinder among the plurality of the cylinders following the first cylinder in the array direction. The second exhaust pipe and the third exhaust pipe are comprised of a tubular member including a merging tubular portion in which exhaust gas from the exhaust port of the second cylinder and exhaust gas from the exhaust port of the third cylinder are merged; and a downstream tubular portion continued to the merging tubular portion via a communication opening portion, and formed on a downstream side in a flow direction of the exhaust gas. The first exhaust pipe is comprised of a pipe member. The merging tubular portion is comprised of combining a plurality of plate members, at least a part of which is formed by press working. The downstream tubular portion is disposed in such a way as to be offset on a side of the one end with respect to a center of the plurality of the cylinder in the array direction. A distal end of the first exhaust pipe is disposed inside the downstream tubular portion through the communication opening portion.

In the exhaust device for the engine according to the above aspect, the first exhaust pipe is formed by using a pipe member, the second exhaust pipe and the third exhaust pipe are comprised of the tubular member, and the merging tubular portion of the tubular member is comprised of a member formed by a plurality of plate members, at least a part of which is formed by press working. Therefore, as compared with a case where all the exhaust pipes are formed by pipe members, or conversely, a case where all the exhaust pipes are comprised of a member comprised of combining a plurality of plate members, the above configuration is advantageous in miniaturizing the exhaust device.

When all the exhaust pipes are formed by pipe members, it is difficult to miniaturize the exhaust device as described in the above aspect, due to constraints in terms of production such as bending or welding a pipe member.

Further, when all the exhaust pipes are comprised of a member comprised of combining a plurality of plate members, it is difficult to miniaturize the exhaust device, when all the exhaust pipes are formed by a member comprised of combining a plurality of plate members, since it is difficult to form a sharp bent portion of a pipe. Furthermore, when all the exhaust pipes are comprised of a member comprised of combining a plurality of plate members, it is also difficult to miniaturize the exhaust device, when all the exhaust pipes are comprised of one tubular member, since it is necessary to secure a width of a partition portion for separating the exhaust pipes one from another to some extent.

Further, in the exhaust device for the engine according to the above aspect, exhaust interference at least between exhaust gas to be discharged through the first exhaust pipe, and exhaust gas to be discharged through the second exhaust pipe or the third exhaust pipe is suppressed, since the distal end of the first exhaust pipe is disposed inside the downstream tubular portion. Specifically, since the distal end of the first exhaust pipe extends to a position of the downstream tubular portion on a downstream side in a flow direction of exhaust gas with respect to the merging tubular portion where exhaust gas from the second exhaust pipe and exhaust gas from the third exhaust pipe are merged, it is possible to suppress exhaust interference.

Therefore, the exhaust device for the engine according to the above aspect is advantageous in suppressing exhaust interference, while satisfying a demand for miniaturization.

The exhaust device for the engine according to the above aspect may further include an other-end exhaust pipe connected to an exhaust port of an other-end cylinder among the plurality of the cylinders, the other-end cylinder being disposed on the other end in the array direction. The other-end exhaust pipe may be comprised of a pipe member, and a distal end of the other-end exhaust pipe may be received inside the tubular member.

In the exhaust device for the engine employing the above configuration, the other-end exhaust pipe connected to the exhaust port of the other-end cylinder, among the plurality of the cylinders, disposed on the other end (side opposite to the first cylinder) in a cylinder array direction (the above-described array direction) is also comprised of a pipe member. The distal end of the other-end exhaust pipe is received in the tubular member. Therefore, the exhaust device for the engine according to the above aspect is advantageous in securing a pipe length of the other-end exhaust pipe.

Further, in the above aspect, as compared with a case where the other-end exhaust pipe is integrally formed with the tubular member, it is possible to miniaturize the exhaust device.

In the exhaust device for the engine according to the above aspect, an exhaust passage of the other-end exhaust pipe, and an exhaust passage of at least one of the second exhaust pipe and the third exhaust pipe may be separated by a pipe wall constituting the other-end exhaust pipe inside the merging tubular portion.

In the exhaust device for the engine employing the above configuration, the exhaust passage of the other-end exhaust pipe, and the exhaust passage of at least one of the second exhaust pipe and the third exhaust pipe are separated by the pipe wall constituting the other-end exhaust pipe. Therefore, as compared with a case where the exhaust passages are separated by a plate member constituting the merging tubular portion (tubular member), the above configuration is further advantageous in miniaturizing the exhaust device.

In the exhaust device for the engine according to the above aspect, the engine may be a 4-cylinder gasoline engine. An ignition order of the engine may be an order from the first cylinder, the third cylinder, the fourth cylinder, and the second cylinder. An opening of the distal end of the other-end exhaust pipe may be formed on a side of the communication opening portion of the merging tubular portion with respect to a position where exhaust gas from the exhaust port of the second cylinder and exhaust gas from the exhaust port of the third cylinder are merged.

In the exhaust device for the engine employing the above configuration, a 4-cylinder gasoline engine is employed as the engine, and the ignition order is an order from the first cylinder, the third cylinder, the fourth cylinder, and the second cylinder. In an engine as described above, the distal end of the other-end exhaust pipe (fourth exhaust pipe) is disposed on the side of the communication opening portion with respect to a portion of the merging tubular portion where exhaust gas from the exhaust port of the second cylinder and exhaust gas from the exhaust port of the third cylinder are merged. Therefore, it is possible to securely suppress exhaust interference.

In the exhaust device for the engine according to the above aspect, the downstream tubular portion may be comprised of combining a plurality of plate members, at least a part of which is formed by press working.

When the above configuration is employed, configuring the downstream tubular portion by combining a plurality of plate members is further advantageous in miniaturizing the exhaust device.

In the exhaust device for the engine according to the above aspect, the downstream tubular portion may be integrally formed with the merging tubular portion by the plurality of the plate members.

In the exhaust device for the engine employing the above configuration, since the merging tubular portion and the downstream tubular portion are integrally formed by the plurality of the plate members, it is possible to reduce the number of parts, and avoid cumbersome parts management during production. Further, in the exhaust device for the engine employing the above configuration, by integrally forming the merging tubular portion and the downstream tubular portion, it is possible to reduce the number of steps such as joining, as compared with a case where respective portions are formed as individual parts, and then, are joined to one another. Therefore, the exhaust device for the engine according to the above aspect is advantageous in reducing the production cost.

In the exhaust device for the engine according to the above aspect, an exhaust gas purification device may be connected to the downstream tubular portion on a downstream side in a flow direction of exhaust gas, and the exhaust gas purification device may be disposed in such a way as to extend along the array direction on a lower side of the first exhaust pipe, the second exhaust pipe, and the third exhaust pipe.

In the exhaust device for the engine employing the above configuration, the downstream tubular portion is disposed in such a way as to be offset on the side of the one end (side of the first cylinder), and the exhaust gas purification device to be connected to the downstream tubular portion is disposed in such a way as to extend along a cylinder array direction (the above-described array direction) on a lower side of the merging tubular portion. This is further advantageous in miniaturing the exhaust device.

As described above, each of the exhaust devices is able to suppress exhaust interference, while satisfying a demand for miniaturization.

The invention claimed is:

1. An exhaust device for an engine, the exhaust device being connected to an exhaust port of the engine in which a plurality of cylinders are arranged in series, the exhaust device comprising:
a first exhaust pipe connected to an exhaust port of a first cylinder, among the plurality of the cylinders, disposed at one end in the array direction; and
a second exhaust pipe connected to an exhaust port of a second cylinder, and a third exhaust pipe connected to an exhaust port of a third cylinder, the second cylinder and the third cylinder among the plurality of the cylinders following the first cylinder in the array direction, wherein
the second exhaust pipe and the third exhaust pipe are comprised of a tubular member including a merging tubular portion where exhaust gas from the exhaust port of the second cylinder and exhaust gas from the exhaust port of the third cylinder are merged inside; and a downstream tubular portion continued to the merging tubular portion via a communication opening portion, and formed on a downstream side in a flow direction of the exhaust gas,
the first exhaust pipe is comprised of a pipe member,
the merging tubular portion is comprised of combining a plurality of plate members, at least a part of which is formed by press working,
the downstream tubular portion is disposed in such a way as to be offset on a side of the one end with respect to a center of the plurality of the cylinders in the array direction, and a distal end of the first exhaust pipe is disposed inside the downstream tubular portion through the communication opening portion.

2. The exhaust device for the engine according to claim 1, further comprising
an other-end exhaust pipe connected to an exhaust port of an other-end cylinder among the plurality of the cylinders, the other-end cylinder being disposed on the other end in the array direction, wherein
the other-end exhaust pipe is comprised of a pipe member, and
a distal end of the other-end exhaust pipe is received inside the tubular member.

3. The exhaust device for the engine according to claim 2, wherein
an exhaust passage of the other-end exhaust pipe, and an exhaust passage of at least one of the second exhaust pipe and the third exhaust pipe are separated by a pipe wall constituting the other-end exhaust pipe inside the merging tubular portion.

4. The exhaust device for the engine according to claim 2, wherein
the engine is a 4-cylinder gasoline engine,
the other-end cylinder is a fourth cylinder,
an ignition order of the engine is an order from the first cylinder, the third cylinder, the fourth cylinder, and the second cylinder, and
an opening of the distal end of the other-end exhaust pipe is formed on a side of the communication opening portion of the merging tubular portion with respect to a position where exhaust gas from the exhaust port of the second cylinder and exhaust gas from the exhaust port of the third cylinder are merged.

5. The exhaust device for the engine according to claim 1, wherein
the downstream tubular portion is comprised of combining a plurality of plate members, at least a part of which is formed by press working.

6. The exhaust device for the engine according to claim 5, wherein
the downstream tubular portion is integrally formed with the merging tubular portion by the plurality of the plate members.

7. The exhaust device for the engine according to claim 1, wherein
an exhaust gas purification device is connected to the downstream tubular portion on a downstream side in a flow direction of exhaust gas and
the exhaust gas purification device is disposed in such a way as to extend along the array direction on a lower side of the first exhaust pipe, the second exhaust pipe, and the third exhaust pipe.

* * * * *